(12) United States Patent
Brookins (10) Patent No.: US 9,995,508 B2
(45) Date of Patent: Jun. 12, 2018

(54) SYSTEMS FOR HEATING WATER USED IN HYDRAULIC FRACTURING

(71) Applicant: Multitek North America, LLC, Prentice, WI (US)

(72) Inventor: Ernie Brookins, West Fargo, ND (US)

(73) Assignee: Multitek North America, LLC, Prentice, WI (US)

( * ) Notice: Subject to any disclaimer, the term of this patent is extended or adjusted under 35 U.S.C. 154(b) by 217 days.

(21) Appl. No.: 14/925,090

(22) Filed: Oct. 28, 2015

(65) Prior Publication Data

US 2016/0138834 A1    May 19, 2016

Related U.S. Application Data

(60) Provisional application No. 62/081,178, filed on Nov. 18, 2014.

(51) Int. Cl.
*F24J 3/00* (2006.01)
*B60H 1/22* (2006.01)
(Continued)

(52) U.S. Cl.
CPC .............. *F24J 3/003* (2013.01); *B60H 1/038* (2013.01); *B60H 1/22* (2013.01); *F04B 9/10* (2013.01);
(Continued)

(58) Field of Classification Search
CPC ..... F24J 3/003; F24J 3/006; F24J 3/00; F04B 9/10; F04B 19/04; F04B 53/08;
(Continued)

(56) References Cited

U.S. PATENT DOCUMENTS 2,316,522 A * 4/1943 Loeffler .................. F22B 27/12
122/11
2,432,079 A * 12/1947 Albert, Jr. .................. F04B 9/10
166/62
(Continued)

FOREIGN PATENT DOCUMENTS

| JP | 09272326 A | * | 10/1997 | ............. B60H 1/038 |
| JP | 2002029250 A | * | 1/2002 | ............... B60H 1/03 |
| JP | 2002031075 A | * | 1/2002 | ............... B60H 1/03 |

OTHER PUBLICATIONS

APFP, "Volume Flow and Temperature Rise in Centrifugal Pumps", Training Document, Dec. 6, 2011, available at https://communities. acs.org/servlet/JiveServlet/previewBody/6974-102-1-8337/ Volume_Flow_and_Temperature_Rise_in_Centrifugal_Pumps.pdf.
(Continued)

*Primary Examiner* — Gregory Huson
*Assistant Examiner* — Daniel E Namay
(74) *Attorney, Agent, or Firm* — Andrus Intellectual Property Law, LLP (57) ABSTRACT

A system for flameless heating of a fluid includes a hydraulic pump having an input shaft and a rotational power source coupled in torque-transmitting relationship with the input shaft of the hydraulic pump. A hydraulic fluid circuit is in fluid connection with an inlet port and an outlet port of the hydraulic pump. A water heat exchanger having a tank provided with water from a water source and a conduit provided with heated fluid from at least one of the hydraulic pump and the power source is arranged such that heat is transferred from the heated fluid in the conduit to the water in the tank. In one example, at least one valve in the hydraulic fluid circuit selectively limits output flow from the
(Continued)

outlet port of the hydraulic pump, thereby providing resistance to pumping motion and heating the hydraulic fluid in the hydraulic pump.

17 Claims, 5 Drawing Sheets

(51) Int. Cl.
| | |
|---|---|
| B60H 1/03 | (2006.01) |
| F04B 9/10 | (2006.01) |
| F04B 19/04 | (2006.01) |
| F04B 53/08 | (2006.01) |
| F28F 27/02 | (2006.01) |
| F24H 1/06 | (2006.01) |
| B60H 1/02 | (2006.01) |
| B60H 1/00 | (2006.01) |
| F28D 21/00 | (2006.01) |

(52) U.S. Cl.
CPC .............. *F04B 19/04* (2013.01); *F04B 53/08* (2013.01); *F28F 27/02* (2013.01); *B60H 1/00314* (2013.01); *F28D 2021/0019* (2013.01)

(58) Field of Classification Search
CPC ............... F28D 2021/0098; F24H 1/06; F24H 1/00314; F24H 1/038; B60H 1/00314; B60H 1/038; B60H 1/22
USPC ......... 237/19, 13, 12.1, 12.3 B, 34; 126/247, 126/344; 122/1 C, 11, 26; 123/41.44, 123/41.47
See application file for complete search history.

(56) References Cited

U.S. PATENT DOCUMENTS

| | | | | |
|---|---|---|---|---|
| 3,828,847 | A * | 8/1974 | Stein | F24D 3/082 122/15.1 |
| 4,387,701 | A * | 6/1983 | Gibbons | F24J 3/003 126/247 |
| 4,481,934 | A * | 11/1984 | Stephenson | F24J 3/003 122/26 |
| 4,599,868 | A * | 7/1986 | Lutjens | F17C 9/02 237/12.3 B |
| 4,691,687 | A * | 9/1987 | Mutchler | F24H 3/065 126/104 A |
| 4,993,377 | A * | 2/1991 | Itakura | B60H 1/038 123/142.5 R |
| 5,038,853 | A * | 8/1991 | Callaway, Sr. | F24J 3/00 165/169 |
| 5,085,269 | A * | 2/1992 | Aoki | B60H 1/00007 122/26 |
| 5,181,655 | A | 1/1993 | Bruckelmyer | |
| 5,318,100 | A * | 6/1994 | Aoki | B60H 1/00007 122/26 |
| 5,333,679 | A * | 8/1994 | Suzuki | B60H 1/22 122/26 |
| 5,517,822 | A * | 5/1996 | Haws | F01K 17/025 122/1 R |
| 5,838,880 | A | 11/1998 | Brooks, Jr. et al. | |
| 5,964,402 | A | 10/1999 | Jakobson | |
| 6,082,316 | A * | 7/2000 | Ban | B60H 1/038 122/26 |
| 6,148,910 | A * | 11/2000 | Warner | B60H 1/00278 165/297 |
| 6,244,232 | B1 * | 6/2001 | Ban | B60H 1/038 123/142.5 R |
| 6,354,511 | B1 * | 3/2002 | Hardee | F24H 1/06 126/205 |
| 6,761,135 | B1 * | 7/2004 | Becktold | B08B 3/026 122/396 |
| 7,032,544 | B2 * | 4/2006 | Kuo | F22B 3/06 122/26 |
| 7,380,728 | B2 * | 6/2008 | Augenstein | B60H 1/038 165/41 |
| 7,441,986 | B2 | 10/2008 | Rottinghaus | |
| 7,824,290 | B1 | 11/2010 | Brookins | |
| 8,113,440 | B2 * | 2/2012 | Sanger | B60H 1/00485 122/26 |
| 8,162,233 | B2 * | 4/2012 | Sanger | B60H 1/00485 122/11 |
| 8,371,251 | B2 * | 2/2013 | Frick | F01K 27/02 122/406.1 |
| 8,403,234 | B2 * | 3/2013 | Wolter | B60H 1/00364 123/142.5 R |
| 8,464,963 | B2 * | 6/2013 | Roth | F16D 48/06 122/26 |
| 8,726,870 | B2 | 5/2014 | Cronin | |
| 9,623,720 | B2 * | 4/2017 | Roth | F16D 48/06 |
| 2005/0098643 | A1 | 5/2005 | Guyer | F24D 5/02 237/12.1 |
| 2005/0205682 | A1 * | 9/2005 | Sanger | B60H 1/00314 237/10 |
| 2006/0060156 | A1 * | 3/2006 | Kuo | F24J 3/003 122/26 |
| 2008/0060375 | A1 * | 3/2008 | Sanger | B60H 1/00485 62/265 |
| 2008/0060588 | A1 * | 3/2008 | Isopo | F22B 3/06 122/26 |
| 2008/0245882 | A1 * | 10/2008 | Sanger | B60H 1/00485 237/12.3 R |
| 2008/0265046 | A1 * | 10/2008 | Grimes | F24D 17/0078 237/19 |
| 2009/0223948 | A1 * | 9/2009 | Hess | F24J 3/00 219/628 |
| 2009/0236435 | A1 * | 9/2009 | Kudo | F01P 11/20 237/12.3 B |
| 2010/0025486 | A1 * | 2/2010 | Sanger | F28D 7/1607 237/1 R |
| 2010/0044450 | A1 * | 2/2010 | Roth | F24J 3/003 237/12.3 R |
| 2011/0005757 | A1 | 1/2011 | Hebert | |
| 2011/0088681 | A1 * | 4/2011 | Khodaverdyan | F24J 3/003 126/247 |
| 2012/0210953 | A1 * | 8/2012 | Cronin | F24J 3/003 123/2 |
| 2012/0291765 | A1 * | 11/2012 | Griggs | F24J 3/003 126/247 |
| 2013/0284817 | A1 | 10/2013 | Welle et al. | |
| 2014/0174691 | A1 | 6/2014 | Kamps et al. | |
| 2014/0209281 | A1 | 7/2014 | Kamps et al. | |
| 2014/0261243 | A1 * | 9/2014 | Bickel | F03D 9/006 122/26 |
| 2014/0261720 | A1 | 9/2014 | Bell et al. | |
| 2014/0263681 | A1 | 9/2014 | Bell et al. | |
| 2015/0086933 | A1 | 3/2015 | Bell et al. | |
| 2015/0090198 | A1 | 4/2015 | Bell et al. | |

OTHER PUBLICATIONS

Conleymax, Flameless Heater, webpage, available at least as early as Mar. 1, 2013, available at http://www.conleynnax.com/services/water-heating.php.

* cited by examiner

SYSTEMS FOR HEATING WATER USED IN HYDRAULIC FRACTURING

CROSS-REFERENCE TO RELATED APPLICATION

The present application claims the benefit of U.S. Provisional Application Ser. No. 62/081,178, filed Nov. 18, 2014, which is hereby incorporated by reference herein.

FIELD

The present disclosure relates to systems for flameless heating of water and other fluids, and for providing heat and/or steam to the surrounding air. In one example, the water is used for hydraulic fracturing.

BACKGROUND

U.S. Pat. No. 7,824,290, which is incorporated by reference herein, discloses rotational power distribution and control systems and components thereof along with related methods. The rotational power distribution and control system may, for example, be operable to function similarly to a typical automotive manual clutch. Other embodiments of the rotational power distribution and control system may function as continuously or infinitely variable transmissions. Still further embodiments of the rotational power distribution and control system may function as hybrid drive systems for various types of vehicles, including automobiles, trucks and busses. The rotational power distribution and control system includes at least one hydrostatic pump/motor and a rotational power dividing apparatus.

U.S. Patent Application Publication No. 2014/0174691, which is incorporated by reference herein, discloses a heating system that is connected to a source of supply fluid to be heated, and that has an internal combustion engine provided with engine coolant and gases that flow to and from the engine, and are heated thereby. A heat generator is provided in fluid communication with a supply of heat transfer fluid for circulating the heat transfer fluid in the heat generator causing fluid friction to create heat directly in the heat transfer fluid, and provide heated heat transfer fluid that is not in fluid communication with the engine. A fluid heat exchanger arrangement is provided in fluid communication with the supply fluid, the engine coolant, the gases of the engine and the heated transfer fluid for transferring heat from the heated engine coolant, the heated engine gases, and the heated transfer fluid to heat the supply fluid.

U.S. Patent Application Publication No. 2014/0209281, which is incorporated herein by reference, discloses a heating system for heating at least one of a fluid-filled conduit arrangement and a volume of air including an internal combustion engine provided with engine coolant that flows to and from the engine and is heated thereby. A fluid heat exchanger is provided in fluid communication with a heat transfer fluid stored in a reservoir and the engine coolant of the internal combustion engine. The fluid heat exchanger receives heated engine coolant from the internal combustion engine, and transfers heat from the heated engine coolant to the heat transfer fluid to provide heated transfer fluid. A heat generator is provided in fluid communication with the fluid heat exchanger, and receives the heated transfer fluid from the fluid heat exchanger for further heating. This heated transfer fluid may then be selectively used to heat a conduit or a volume of air.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure is of a system for flameless heating of a fluid including a hydraulic pump having an input shaft and a rotational power source coupled in torque-transmitting relationship with the input shaft of the hydraulic pump. A hydraulic fluid circuit is in fluid connection with an inlet port and an outlet port of the hydraulic pump. A water heat exchanger having a tank provided with water from a water source and a conduit provided with heated fluid from at least one of the hydraulic pump and the power source is arranged such that heat is transferred from the heated fluid in the conduit to the water in the tank.

According to another example of the present disclosure, a system for flameless heating of a fluid includes a hydraulic pump having an input shaft and a rotational power source coupled in torque-transmitting relationship with the input shaft of the hydraulic pump. A hydraulic fluid circuit is in fluid connection with an inlet port and an outlet port of the hydraulic pump. At least one valve in the hydraulic fluid circuit selectively limits output flow from the outlet port of the hydraulic pump, thereby providing resistance to pumping motion and heating the hydraulic fluid in the hydraulic pump. A water heat exchanger having a tank provided with water from a water source and a first group of conduits provided with heated hydraulic fluid from the hydraulic pump is arranged such that heat is transferred from the heated hydraulic fluid in the first group of conduits to the water in the tank.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

In certain applications, mobile heating systems are utilized to heat fluids, such as water or water-based liquid solutions, collectively termed "process water," for distribution through tanks and reservoirs. For example, one such application commonly known as a hydraulic fracturing or a "frac job," involves injecting large quantities of a heated aqueous solution into a subterranean formation of an oil or gas well to hydraulically fracture the formation to release the oil or gas. Such frac jobs are normally used to initiate production in low permeability reservoirs, or to re-stimulate production in older producing wells. The heated water is typically combined with and acts to dissolve a mixture of chemical additives, propants (light sand), foams, and a guar gel, that helps carry the sand down into the well. This fracking liquid solution is injected into a well at a high flow rate and pressure to break up the formation (e.g., 10,000 psi at up to 100 barrels per minute), and help the gas or oil flow towards the surface. The water is further contaminated while it is in the ground during hydraulic fracturing. Some of the contaminants can be easily separated from the water after it is returned to the surface; however, there is a large amount of salt in the water which cannot easily be removed. Therefore, the used, contaminated water must be hauled away from the oil well and then disposed of at a waste disposal site. New water must thus be continually used for the fracking operation.

To save on the use of large volumes of fresh water used for fracking, and also to eliminate the need for huge waste disposal sites, there is need for a method for removing salt from the used fracking water so that the fracking water can be re-used. This disclosure relates to removing salt from water in any situation by boiling the water and condensing the resulting steam, but most particularly to removing salt from the water used for fracking in oil fields.

Hydraulic fracturing is performed at remote well sites and usually requires a short period of time to complete. Consequently, the construction of a permanent heating facility at the site is not cost effective, and a mobile heating system can instead be used. Such a mobile heating system needs to be designed mindful of current U.S. government safety regulations, which provide that open flame heating cannot take place in the immediate vicinity of the well. While safety concerns are of overriding importance, compliance with such "no flame" regulations requires additional time and expense to provide the requisite liquid heating. Accordingly, improvements in providing a flameless, self-contained mobile system for heating the contaminated water to boiling temperatures are highly desirable.

The system of the present disclosure has several additional uses besides boiling contaminated water so that salt can be removed therefrom. One is to heat the air during the cold months. Another is to heat clean water used for fracking. Another is to produce electricity. Thus, the present disclosure relates to heating many different types of fluids, such as liquids, gases, and other flowable substances such as diesel oil or glycol-based products, in order to effect heat exchange between one fluid and another, or between a fluid and the surrounding air.

Using a design similar to that provided in the '290 patent incorporated by reference herein above, a hydraulic pump 44 is coupled to an internal combustion engine or some other power source 10 such as an external combustion engine or an electric or pneumatic motor. See FIG. 1. A drive flange 34 of the power source 10 is coupled in torque-transmitting relationship to a pump input shaft 46, which is in turn coupled to a cylinder block of a hydraulic pump 44, such as for example via a ball guide 40 (see also FIG. 5) located in the pump 44. A hydraulic fluid circuit 12 is connected to the hydraulic pump 44 by way of first and second (outlet and inlet) ports 122, 123 on the pump 44. The fluid in the hydraulic fluid circuit 12 is heated by the pumping action of the pump 44. The hydraulic fluid used in the pump 44 and circuit 12 may be any appropriate fluid known to those skilled in the art. In one embodiment, the hydraulic fluid used in any of the systems represented herein may be a grade of diesel oil suitable for such applications. Valves in the hydraulic fluid circuit 12 are used to selectively control the fluid flow. The valves also are used to create backpressure in the system and put a load on the power source 10, thereby creating more heat in the hydraulic fluid circuit 12 in addition to the heat caused by fluid friction as the fluid flows through the valve restrictions. This will be described more fully with respect to FIG. 5.

Figure 5:
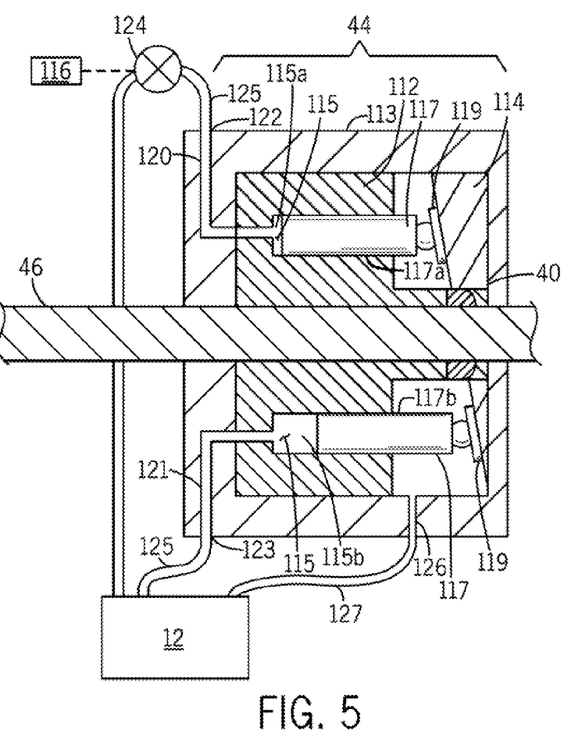
FIG. 5 illustrates one example of a hydraulic pump that can be used in the system of the present disclosure.

The hydraulic pump 44 illustrated in FIG. 5 is a hydrostatic axial piston pump. Other hydraulic pump designs known to those skilled in the art, such as radial piston pumps, may be utilized in place of or in addition to the illustrated axial piston pump. Preferably, the type of hydraulic pump used includes reciprocating pistons such as those in axial piston pumps and radial piston pumps. In FIG. 5, the input shaft 46 (rotated by the power source 10) is splined to a cylinder block 112 of the hydraulic pump 44 such that the cylinder block 112 rotates along with the input shaft 46. The cylinder block 112 is operable to rotate about the rotational axis of the input shaft 46 within a housing 113 of the hydraulic pump 44. The housing 113 may be maintained in a stationary position. Within the housing 113 is an angled swash plate 114, which, in the embodiment of FIG. 5, is at a fixed angle and is fixed to the housing 113. Within the cylinder block 112 are a plurality of axial bores 115, such as axial bores 115*a* and 115*b*. Within the plurality of axial bores 115 are a plurality of slidably disposed pistons 117, such as pistons 117*a* and 117*b*. Each of the plurality of pistons 117 has a shoe 119 for slidably interfacing against the swash plate 114.

As the plurality of pistons 117 rotate along with the cylinder block 112, they interface with the swash plate 114, hydraulic fluid passage 120 and hydraulic fluid passage 121 embedded in the housing 113. Hydraulic fluid passage 120 may be a single passage or a network of interconnected passages in fluid communication with a first port 122. Hydraulic fluid passage 121 may be a single passage or a network of interconnected passages in fluid communication with a second port 123. The swash plate 114 is held stationary relative to and along with the housing 113. Therefore, as the pistons 117 ride along the swash plate 114 during rotation of the cylinder block 112, they experience a compressive force for one half of each rotation of the cylinder block 112 (by axial movement within the corresponding axial bore 115). This compressive force corresponds to the rotation of each individual piston 117 as it rotates to axially move the piston 117 relative to its axial bore 115 from an extended position as shown by piston 117*b* to a compressed position as shown by piston 117*a*. Accordingly, rotation of the cylinder block 112 causes the pistons 117 to axially reciprocate within their respective axial bores 115 via engagement with the swash plate 114.

The hydraulic fluid passage 120 is arranged so that all axial bores 115, such as axial bore 115*a*, that contain pistons 117, such as piston 117*a*, that are undergoing the compression stroke (due to their interaction with the swash plate 114 as the cylinder block 112 rotates within the housing 113, and where a compression stroke for a piston 117 would be from a position corresponding with the axial position of piston 117*b* to a position corresponding with the axial position of the piston 117*a*) are in fluid communication with a first port 122. The housing 113 also contains hydraulic fluid passage 121, which is arranged so that all axial bores 115, such as axial bore 115*b*, that contain pistons 117, such as piston 117b, that are undergoing an expansion stroke (as the cylinder block 112 rotates within the housing 113, and where an expansion stroke for a piston 117 would be from a position corresponding with the axial position of piston 117a to a position corresponding to the axial position of piston 117b) are in fluid communication with a second port 123. In this regard, as the cylinder block 112 rotates within the housing 113, all axial bores 115 will rotate into and out of fluid communication with hydraulic fluid passages 120 and 121. Accordingly, as pistons 117, such as piston 117a, undergo a compression stroke, the hydraulic fluid may be forced through hydraulic fluid passage 120 and the first port 122 may be the high-pressure outlet port of the hydraulic pump 44. Similarly, as pistons 117, such as piston 117b, undergo an expansion stroke, the hydraulic fluid may be drawn into (or forced into under pressure) hydraulic fluid passage 121, and the second port 123 may be the relatively low-pressure inlet port of the hydraulic pump 44.

To ensure that each of the plurality of pistons 117 undergoing an expansion stroke remains in continuous contact with the swash plate 114, the hydraulic fluid circuit 12 may provide hydraulic fluid to the second port 123 under a predetermined pressure. This pressure may be supplied by, for example, a charge pump. The charge pump may be a pump separate from the hydraulic pump 44 or it may be integrated into the hydraulic pump 44.

A valve 124 connected to the first port 122 of the hydraulic pump 44 through a hydraulic line 125 may be operable to restrict the flow of hydraulic fluid from the first (outlet) port 122. For example, if the valve 124 is used to restrict the output of the hydraulic pump 44, this flow restriction may result in greater resistance to compression of the pistons 117 as they rotate from an extended position, such as shown by piston 117b, to a compressed position, such as shown by piston 117a. This resistance produces heat as the work input by the power source 10 is lost to mechanical friction. Additionally, restricting the output flow causes a pressure drop, which in turn dissipates energy in the form of heat. Greater resistance to piston compression produces greater heat, thereby heating the hydraulic fluid in the hydraulic pump 44. Thus, the valve 124 is at least one valve in the hydraulic fluid circuit 12 that selectively limits output flow from the outlet port 122 of the hydraulic pump 44, thereby providing resistance to pumping motion and heating the hydraulic fluid in the hydraulic pump 44. In one example, a user input device 116 is provided that allows a user to selectively control a position of the valve 124 and thereby control an amount of heating of the hydraulic fluid. The hydraulic fluid circuit 12 may contain further valves in addition to the at least one valve 124 at the outlet port 122, where the hydraulic fluid is further directly heated by fluid friction.

The housing 113 of the hydraulic pump 44 may contain a hydraulic fluid drain 126 connected to the hydraulic fluid circuit 12 via a leaked fluid return path 127. The drain 126 may be operable to collect any hydraulic fluid that has leaked out of the cylinder block 112 either, for example, by leaking past the pistons 117, or by leaking from the interface between the cylinder block 112 and the housing 113. In this respect, the hydraulic fluid circuit 12 and hydraulic pump 44 may form a closed system where no external source of hydraulic fluid is required and no hydraulic fluid leaks from the system. Additionally, aside from a leaked fluid return path 127, the hydraulic fluid circuit 12 and hydraulic pump 44 may form a hydraulic system that is completely filled with hydraulic fluid and therefore does not contain any substantial gas pockets.

Although the swash plate 114 in FIG. 5 is shown at a fixed angle, a variable angle swash plate may be used. Such a swash plate mechanism may include a swash plate inclinable on a pivot by an actuator. Such arrangements are well known to those skilled in the art. Also, for example, if it is desired to reduce the rotating mass of the system, a configuration where the cylinder block 112 is held stationary and the swash plate 114 is rotated by the input shaft 46 may be used. Such systems typically include a distributor plate keyed to, and rotating with, the swash plate 114 to ensure the proper hydraulic connections between the inlet and outlet ports.

Figure 1:
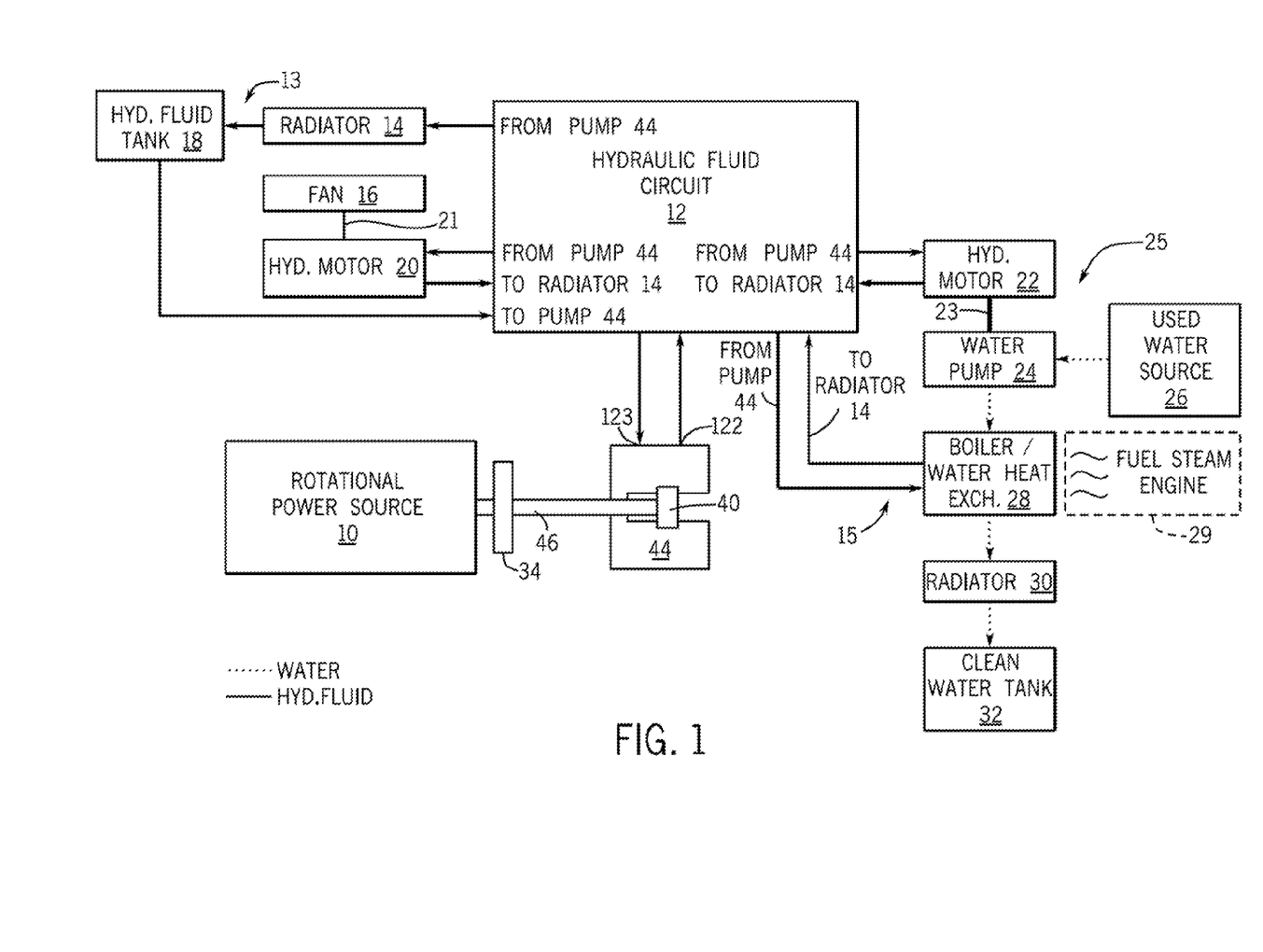
FIG. 1 illustrates one example of a system for flameless heating of a fluid according to the present disclosure.

As shown in FIG. 1, once it leaves the hydraulic pump 44 via valve 124, some of the heated hydraulic fluid travels by way of the fluid circuit 12 (where it may be further heated by further valves) to an air-heating portion 13 of the system, where it is routed through a radiator 14, which is cooled by a fan 16. As the fan 16 blows air past the radiator 14, the air surrounding the radiator 14 is heated. The fluid then travels to a holding tank 18, and then back to the hydraulic pump 44 to complete the hydraulic fluid circuit. By way of at least a three-way valve, some of the flow from the pump 44 is instead directed to a variable hydraulic motor 20 which drives the radiator fan 16 via an output shaft 21. That flow is then directed to rejoin the main flow and travels through the radiator 14 for cooling. According to one embodiment, this particular portion of the system is used as a flameless heater to heat the air.

According to the embodiment of FIG. 1, some of the hydraulic fluid circuit flow is also directed to a water-heating portion 15 of the system, where it is routed though a water heat exchanger 28, such as for example a boiler. The boiler/water heat exchanger 28 is comprised of a water tank containing separate radiator-type cooling devices through which fluids such as the heated hydraulic fluid flow. The heated fluid heats the water in the boiler/water heat exchanger 28 in order to remove salt from the water, as will be described herein below. According to the present example, the fluid flow from the hydraulic pump 44 can be directed to each of the hydraulic motor 20, radiator 14, and boiler/water heat exchanger 28 via a four-way valve or via a series of two- or three-way valves in the hydraulic fluid circuit 12. Alternatively, the fluid flow can be directed only to the air-heating portion 13 of the system or only to the water-heating portion 15 of the system by closing off one or more directions of one or more of the multi-way valves. The valves can be manually or electrically controlled, for example by way of coupling to the user input device 116 (see FIG. 5).

Again using a multi-way valve or a series of multiway valves, part of the flow from the hydraulic pump 44 may be directed to a hydraulic motor 22 in fluid connection with and driven by the hydraulic pump 44 via the hydraulic fluid circuit 12. The hydraulic motor 22 has an output shaft 23 by which it drives a water pump 24 that pumps the water from the water source 26 to the tank of the boiler/water heat exchanger 28. The apparatus can be comprised of a separate motor and pump, or of a pump/motor combination device. The flow though the hydraulic motor 22 is then directed back to the main hydraulic fluid circuit 12 and returned to the hydraulic pump 44 by way of the radiator 14 and hydraulic fluid holding tank 18. A separate water fluid circuit 25 contains contaminated fracking water at used water source 26, from which water travels through the water pump 24 to the boiler/water heat exchanger 28. At boiler/water heat exchanger 28, the salt water is heated by the heated hydraulic fluid to boiling temperature and turned into steam. At that time, the salt which was in the contaminated water falls to the bottom of the heat exchanger's tank, where it can easily be removed at a later time. The steam is directed through a radiator 30 for cooling, and once the steam is cooled sufficiently it returns again to its liquid form as uncontaminated water and is stored in a clean water tank 32. It can then be reused as fresh water for further fracking.

In one example, when hydraulic fluid returns to the hydraulic fluid circuit 12 from each of the hydraulic motor 20, the boiler/water heat exchanger 28, and the hydraulic motor 22, it is subsequently routed through the radiator 14 and the hydraulic fluid holding tank 18 before being provided again to the hydraulic pump 44. This way, any residual heat in the hydraulic fluid is dissipated to the surroundings.

In another embodiment of the present system, the steam created by the boiler/water heat exchanger 28 can be used as fuel to power a steam engine. For example, see the box in dashed lines at 29.

Figure 2:
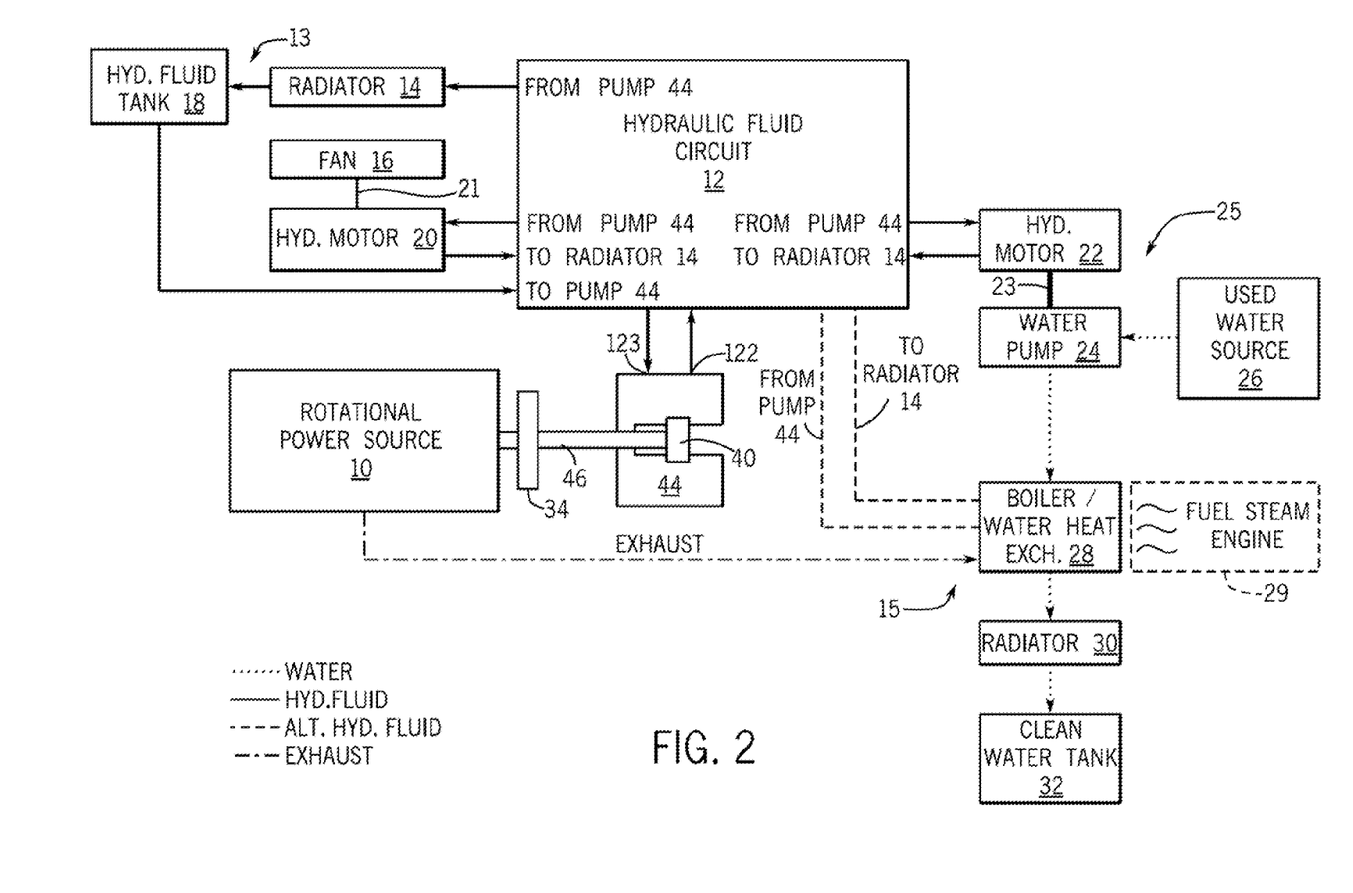
FIG. 2 illustrates another example of a system for flameless heating of a fluid according to the present disclosure.

Turning to FIG. 2, in another embodiment of this invention, rather than using hydraulic fluid from the hydraulic pump 44 to heat the water to turn it into steam, exhaust from the power source 10 (in the case that it is an engine) and water from the water fluid circuit 25 can both be routed into the boiler/water heat exchanger 28, with the exhaust heating the water to turn it into steam. As shown in the dashed lines in FIG. 2, however, another embodiment includes using both the heated hydraulic fluid from the hydraulic pump 44 and the exhaust from the power source 10 in the boiler/water heat exchanger 28 together to heat the water to create steam.

Figure 3:
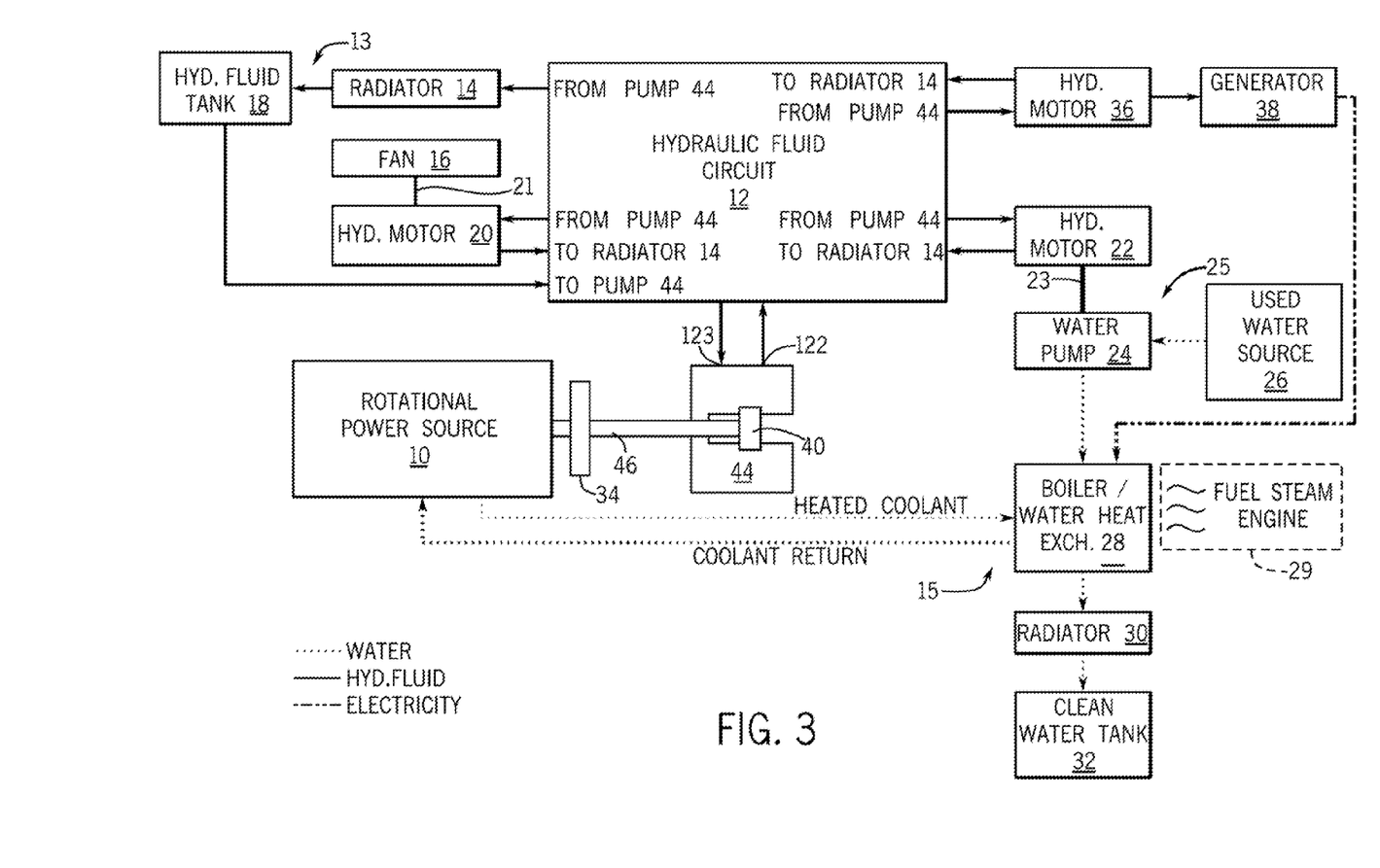
FIG. 3 illustrates another example of a system for flameless heating of a fluid according to the present disclosure.

Referring to FIG. 3, in another embodiment of the invention, another hydraulic motor 36 is provided in fluid connection with and driven by the hydraulic pump 44 via the hydraulic fluid circuit 12. An electrical generator 38 is driven by the hydraulic motor 36. An electrical heating element 204 may be provided in a conduit 202*d* in the water heat exchanger 28 (see FIG. 6). The hydraulic motor 36 drives the electrical generator 38 to produce electricity to power the electrical heating element 204. The generator 38 may also produce electricity at the well site for other uses, such as to provide electricity to heating elements that heat water in the clean water tank 32, which can then be used for further fracking.

Figure 4:
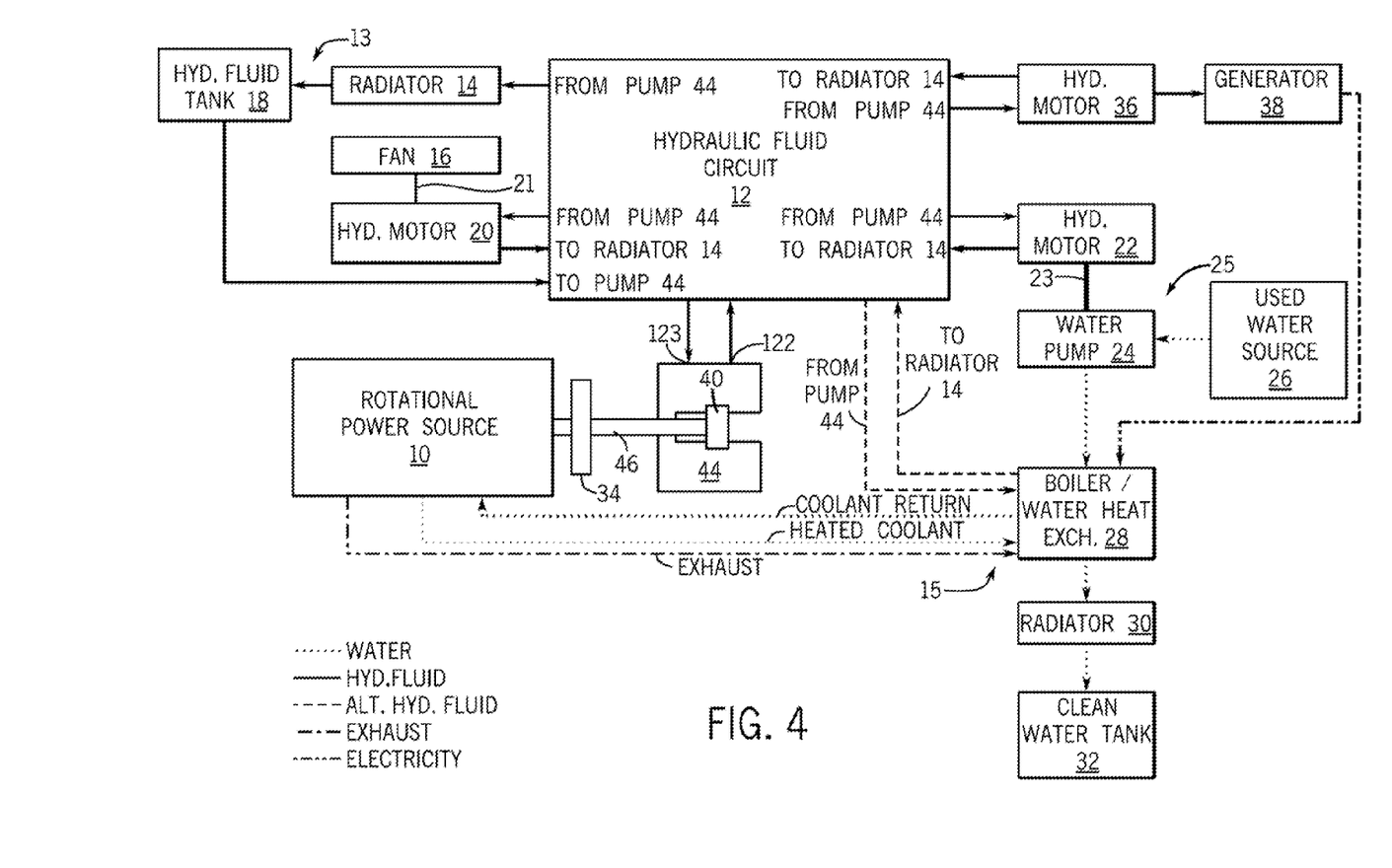
FIG. 4 illustrates another example of a system for flameless heating of a fluid according to the present disclosure.

Referring to FIG. 4, another embodiment would be to pump the power source's heated coolant using the water pump of the power source 10 to the boiler/water heat exchanger 28. The heated coolant can be provided to the boiler/water heat exchanger 28 by way of a separate radiator-type cooling device (conduit), and used to heat the contaminated fracking water.

The use of all four of these methods for heating the contaminated fracking water at the same time (i.e. hydraulic fluid from pump 44, exhaust from power source 10, electricity from generator 38, and heated coolant from power source 10) allows for faster flow and faster heating, and thus more salt removed from the used water source 26 in a shorter period of time. Of course, any combination of two or three of these methods would also result in faster heating than use of only one method. For example, referring to FIG. 6, the boiler/water heat exchanger 28 may have a tank 200 provided with water from the water source 26 and a conduit 202 provided with heated fluid from at least one of the hydraulic pump 44 and the power source 10. The boiler/water heat exchanger 28 may be arranged such that heat is transferred from the heated fluid in the conduit 202 to the water in the tank 200.

Figure 6:
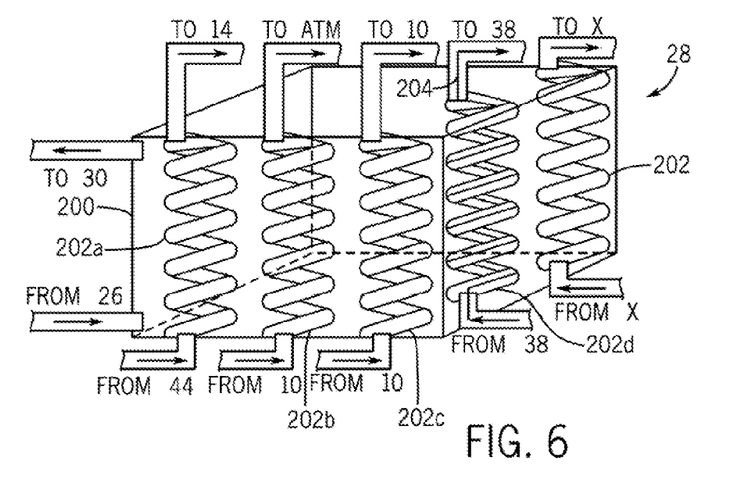
FIG. 6 illustrates one example of a radiator/water heat exchanger that can be used in the system of the present disclosure.

FIG. 6 shows an example of a boiler/water heat exchanger 28 that can utilize all four methods of heating. The boiler/water heat exchanger 28 includes a large, closed tank 200 having a number of radiator-type cooling units or conduits 202*a*-202*d* provided therein. In this way, the boiler/water heat exchanger 28 resembles a fire tube boiler, in that the water is held in a large tank 200, while heated fluids are passed through the tank 200 by way of tubes or pipes (e.g., conduits 202). Contaminated fracking water is provided via a hose, tube, or similar to the tank 200 from the used water source 26 via the water pump 24. Heat is transferred from the relatively hotter contents of the conduits 202 through the conductive conduit walls into the relatively cooler water in the tank 200. In one example, a conduit 202*a* is provided with heated hydraulic fluid from the hydraulic pump 44. The heated hydraulic fluid passes through the conduit 202*a* at a predetermined rate and then leaves the conduit 202*a* to return to the radiator 14 via the hydraulic fluid circuit 12. Another conduit 202*b* may be provided with exhaust from the power source 10, which exhaust may then exit the conduit 202*b* to the atmosphere. Another conduit 202*c* may be provided with heated coolant (such as water or glycol) from the power source 10, and may return from the conduit 202*c* to the cooling system of the power source 10 to be reheated. Another conduit 202*d* may contain an electrical heating element 204 that is powered by electricity from the generator 38. Of course, many conduits 202 could be provided and different combinations of heat sources provided through or in the conduits 202 to heat the water in the tank 200 most efficiently. For example, first, second, third and fourth groups of conduits 202 could be provided wherein the first group contains conduits provided with heated hydraulic fluid, the second groups contains conduits provided with heated exhaust, and so on. Although not shown herein for purposes of clarity, multiple conduits could be provided in rows and columns behind those conduits that are shown. A row or column of conduits might define a group, or a spaced pattern of conduits might define a group, depending on the heat source intended to flow through the conduit (or to be surrounded by the conduit) and its heating capability.

The number and spacing of conduits should be enough to sufficiently heat the water in the tank 200 to turn it to steam in an efficient period of time. It may be desirable to space the conduits or groups of conduits apart from one another based on heat source so that certain conduits that are less hot than others still dissipate heat into the water. As the water is heated, steam can exit the tank 200 from the top and flow to the radiator 30. In one example, all of the water in the tank 200 must be turned to steam before the salt left at the bottom of the tank can be scraped out of the tank 200 or otherwise removed. In other examples, the tank 200 has separate compartments that allow different batches of water to be heated at different times so that the heat from the power source's fluids, hydraulic fluid, and electrical heating elements is constantly captured to treat the water by turning it to steam.

Because the boiler/water heat exchanger 28 is comprised of a water tank 200 containing separate radiator-type cooling conduits 202, the heated oil, exhaust, and coolant are separated from one another and do not come into direct contact. Heat transfer rather takes place by the conduits 202 being located near or in contact with the contaminated water in the tank 200 of the boiler/heat exchanger 28. The electrically-powered heating elements are also maintained separate from the conduits containing the heated fluids as well as from direct contact with the contaminated water in the tank 200.

Another use for the system described herein would be for street departments to use it to remove excess snow buildup by melting it for disposal. The snow can be melted for example by hot air from the radiator 14, hot air from the radiator 30, or steam from the boiler/water heat exchanger 28.

In another embodiment of this disclosure, the water pump 24 can be used to pump a glycol-type fluid that is stored in containers at the well sites for use in the fracking method. The glycol-type fluid can be pumped through the boiler/heat exchanger 28 in order to heat the glycol-type fluid by transfer of heat from the heated hydraulic fluid, exhaust, and/or coolant in much the same way as contaminated fracking water would be heated.

In one embodiment, the entire system of any of FIGS. 1-4 can be constructed on a mobile trailer with wheels, similar to the heating systems described in the '691 and '281 publications incorporated herein above. This allows the system to be mobile and easily transported to a well site, which as mentioned above are generally not used long enough to require permanent equipment.

In the above description, certain terms have been used for brevity, clarity, and understanding. No unnecessary limitations are to be inferred therefrom beyond the requirement of the prior art because such terms are used for descriptive purposes and are intended to be broadly construed. The different systems described herein may be used alone or in combination with other systems. It is to be expected that various equivalents, alternatives and modifications are possible within the scope of the appended claims. Additionally, use of the words "first," "second", "third," etc. in the appended claims is not intended to connote priority or importance, but merely to distinguish one of several similar elements or machines from another.

What is claimed is:

1. A system for flameless heating of a fluid, the system comprising:
    a hydraulic pump having an input shaft;
    a rotational power source coupled in torque-transmitting relationship with the input shaft of the hydraulic pump;
    a hydraulic fluid circuit in fluid connection with an inlet port and an outlet port of the hydraulic pump;
    at least one valve in the hydraulic fluid circuit that selectively limits output flow from the outlet port of the hydraulic pump, thereby providing resistance to pumping motion and heating hydraulic fluid in the hydraulic pump; and
    a water heat exchanger having a tank provided with water from a water source, a first conduit provided with heated hydraulic fluid from of the hydraulic pump, and a second conduit provided with heated coolant or heated exhaust from the power source, the water heat exchanger being arranged such that heat is transferred from the heated hydraulic fluid in the first conduit and from the heated coolant or the heated exhaust in the second conduit to the water in the tank.

2. The system of claim 1, further comprising a first hydraulic motor in fluid connection with and driven by the hydraulic pump via the hydraulic fluid circuit, wherein the first hydraulic motor drives a water pump that pumps the water from the water source to the tank of the water heat exchanger.

3. The system of claim 2, wherein the first conduit of the water heat exchanger is provided with the heated hydraulic fluid from the hydraulic pump via the hydraulic fluid circuit.

4. The system of claim 3, further comprising:
    a radiator that receives the heated hydraulic fluid from the hydraulic pump via the hydraulic fluid circuit;
    a second hydraulic motor in fluid connection with and driven by the hydraulic pump via the hydraulic fluid circuit; and
    a fan driven by the second hydraulic motor that blows heated air away from the radiator.

5. The system of claim 4, wherein hydraulic fluid returns to the hydraulic fluid circuit from each of the first hydraulic motor, the water heat exchanger, and the second hydraulic motor, and is subsequently routed through the radiator and a hydraulic fluid holding tank before being provided again to the hydraulic pump.

6. The system of claim 2, further comprising:
    a second hydraulic motor in fluid connection with and driven by the hydraulic pump via the hydraulic fluid circuit;
    an electrical generator driven by the second hydraulic motor; and
    an electrical heating element in a third conduit in the water heat exchanger;
    wherein the second hydraulic motor drives the electrical generator to produce electricity to power the electrical heating element.

7. The system of claim 6, wherein the water in the tank of the water heat exchanger is heated by the heated hydraulic fluid from the hydraulic pump flowing through the first conduit, the heated coolant from the power source flowing through the second conduit, the electrical heating element in the third conduit, and the heated exhaust from the power source flowing through a fourth conduit.

8. The system of claim 1, wherein the water in the tank of the water heat exchanger is heated by the heated hydraulic fluid from the hydraulic pump flowing through the first conduit, the heated coolant from the power source flowing through the second conduit, and the heated exhaust from the power source flowing through a third conduit.

9. A system for flameless heating of a fluid, the system comprising:
    a hydraulic pump having an input shaft;
    a rotational power source coupled in torque-transmitting relationship with the input shaft of the hydraulic pump;
    a hydraulic fluid circuit in fluid connection with an inlet port and an outlet port of the hydraulic pump;
    at least one valve in the hydraulic fluid circuit that selectively limits output flow from the outlet port of the hydraulic pump, thereby providing resistance to pumping motion and heating hydraulic fluid in the hydraulic pump;
    a water heat exchanger having a tank provided with water from a water source and a first group of conduits provided with the heated hydraulic fluid from the hydraulic pump, the water heat exchanger being arranged such that heat is transferred from the heated hydraulic fluid in the first group of conduits to the water in the tank;
    a first hydraulic motor in fluid connection with and driven by the hydraulic pump via the hydraulic fluid circuit, wherein the first hydraulic motor drives a water pump that pumps the water from the water source to the tank of the water heat exchanger.

10. The system of claim 9, further comprising a second group of conduits in the water heat exchanger that are provided with at least one of heated exhaust and heated coolant from the power source.

11. The system of claim 10, further comprising a third group of conduits in the water heat exchanger that hold electrical heating elements.

12. The system of claim 11, further comprising:
a second hydraulic motor in fluid connection with and driven by the hydraulic pump via the hydraulic fluid circuit; and
an electrical generator driven by the second hydraulic motor;
wherein the second hydraulic motor drives the electrical generator to produce electricity to power the electrical heating elements.

13. The system of claim 12, further comprising:
a radiator that receives the heated hydraulic fluid from the hydraulic fluid circuit; and
a hydraulic fluid holding tank downstream of the radiator and upstream of the inlet port of the hydraulic pump;
wherein hydraulic fluid returns to the hydraulic fluid circuit from each of the first hydraulic motor, the water heat exchanger, and the second hydraulic motor, and is subsequently routed through the radiator and the hydraulic fluid holding tank before being provided again to the hydraulic pump.

14. The system of claim 13, further comprising:
a third hydraulic motor in fluid connection with and driven by the hydraulic pump via the hydraulic fluid circuit; and
a fan driven by the third hydraulic motor that blows heated air away from the radiator.

15. The system of claim 9, wherein the hydraulic pump is an axial piston pump.

16. The system of claim 9, wherein the power source is an internal combustion engine.

17. The system of claim 9, further comprising a user input device that allows a user to selectively control a position of the at least one valve to thereby control an amount of heating of the hydraulic fluid.

\* \* \* \* \*

UNITED STATES PATENT AND TRADEMARK OFFICE
CERTIFICATE OF CORRECTION

PATENT NO. : 9,995,508 B2
APPLICATION NO. : 14/925090
DATED : June 12, 2018
INVENTOR(S) : Ernie Brookins Page 1 of 1

It is certified that error appears in the above-identified patent and that said Letters Patent is hereby corrected as shown below:

In the Claims

In Claim 1, Column 9, Line 49, the word "of" should be deleted.

Signed and Sealed this
Seventh Day of August, 2018

Andrei Iancu
*Director of the United States Patent and Trademark Office*